United States Patent
Kikuchi et al.

[11] Patent Number: 5,900,609
[45] Date of Patent: May 4, 1999

[54] POS SYSTEM

[75] Inventors: Kaoru Kikuchi, Hachioji; Miyuki Sato; Shinichi Yoshinaga, both of Kawasaki, all of Japan

[73] Assignee: Fujitsu Limited, Kawasaki, Japan

[21] Appl. No.: 08/904,318

[22] Filed: Jul. 31, 1997

Related U.S. Application Data

[62] Division of application No. 08/509,420, Jul. 31, 1995, Pat. No. 5,689,101, which is a continuation of application No. 08/273,787, Jul. 12, 1994, abandoned.

[30] Foreign Application Priority Data

Nov. 29, 1993 [JP] Japan .................................. 5-298382

[51] Int. Cl.⁶ .................................................. G06K 15/00
[52] U.S. Cl. ........................................ 235/383; 235/472
[58] Field of Search ..................................... 235/383, 472

[56] References Cited

U.S. PATENT DOCUMENTS

| | | |
|---|---|---|
| 5,023,438 | 6/1991 | Wakasuki et al. . |
| 5,250,789 | 10/1993 | Johnsen .................... 235/383 |
| 5,298,476 | 3/1994 | Hotta et al. ............... 235/462 X |
| 5,347,115 | 9/1994 | Sherman et al. ............. 235/472 |
| 5,361,871 | 11/1994 | Gupta et al. ............... 235/383 |
| 5,365,048 | 11/1994 | Komiya ..................... 235/472 |
| 5,369,265 | 11/1994 | Adachi ..................... 235/470 |
| 5,382,779 | 1/1995 | Gupta ...................... 235/383 |
| 5,393,965 | 2/1995 | Brauaman et al. ........... 235/472 |
| 5,448,046 | 9/1995 | Swartz ..................... 235/383 |
| 5,543,607 | 8/1996 | Watanabe et al. ............ 235/383 |
| 5,560,450 | 10/1996 | Kouno ...................... 235/383 |

FOREIGN PATENT DOCUMENTS

| | | |
|---|---|---|
| 443 407 | 8/1991 | European Pat. Off. . |
| 491 348 | 6/1992 | European Pat. Off. . |
| 513 456 | 11/1992 | European Pat. Off. . |
| 52-132651 | 11/1977 | Japan . |
| 58-96367 | 6/1983 | Japan . |
| 63-36119 | 2/1988 | Japan . |
| 63-145591 | 6/1988 | Japan . |
| 63-223998 | 9/1988 | Japan . |
| 2-277412 | 11/1990 | Japan . |
| 3-232079 | 10/1991 | Japan . |
| 4-293198 | 10/1992 | Japan . |
| 93/04449 | 3/1993 | WIPO . |

*Primary Examiner*—Harold Pitts
*Attorney, Agent, or Firm*—Armstrong, Westerman, Hattori, McLeland & Naughton

[57] ABSTRACT

The invention provides a POS system which employs a purchased commodity accommodating and transporting apparatus having a self scanning function and is improved in that the access time for data transfer processing is reduced to reduce the time required for settlement of accounts and complete transfer of data is assured to enhance the reliability. A two-dimensional bar code printing section is provided on the purchased commodity accommodating and transporting apparatus and prints commodity code information from a commodity code reading section as a two-dimensional bar code. A two-dimensional bar code reading section for reading the two-dimensional bar code printed by the two-dimensional bar code printing section, a price retrieval section for retrieving prices of commodities in the accommodation section in accordance with the two-dimensional bar code information, and a totalization section for performing final settlement of accounts for the purchased commodities accommodated in the accommodation section in accordance with a result of the retrieval by the price retrieval section are provided on a settlement POS terminal.

1 Claim, 13 Drawing Sheets

POS SYSTEM

This is a divisional of application Ser. No. 08/509,420 filed Jul. 31, 1995 now U.S. Pat. No. 5,689,101 which is a continuation of application Ser. No. 08/273,787 filed Jul. 12, 1994, now abandoned.

BACKGROUND OF THE INVENTION

1) Field of the Invention

This invention relates to a POS system which employs a purchased commodity accommodating and transporting apparatus such as a shopping cart (hand cart) or a shopping basket for use in the distribution industry, particularly in a store such a mass sales store, a convenience store or a supermarket to allow a customer to accommodate and transport a purchased commodity, and more particularly to a POS system which employs a purchased commodity accommodating and transporting apparatus (scanning cart) having a self scanning function to allow a customer to purchase a commodity while the customer itself reads a commodity code such as a bar code applied to the commodity.

2) Description of the Related Art

Generally, a POS system is employed in various stores such as supermarkets and convenience stores. In the POS system, a customer walks around in a store pushing a shopping cart or carrying a shopping basket, places commodities to be purchased into the shopping cart or the shopping basket, and comes to a settlement POS terminal (POS register).

Then at the settlement POS terminal, an operator takes out the commodities one by one from the shopping cart or the shopping basket and reads the bar codes (commodity codes) applied to the commodities by means of a scanner to effect registration processing. In particular, in accordance with commodity code information read from each bar code, the price of the commodity corresponding to the commodity code is retrieved from a commodity price file (PLU (Price Look Up) file), and a total amount of money of the purchased commodities is calculated to settle the accounts.

With such POS system, however, since an operator must perform a reading operation of a commodity code of each commodity, much time is required for such reading operation and a settling operation, which causes the customer to wait for a long time. Accordingly, in a time band in which customers are crowded, a queue of customers is produced in front of a settlement POS terminal, and besides, the burden on the operator is heavy.

Thus, in recent years, a shopping cart (scanning cart) or a shopping basket having a scanner (commodity code reading section) for reading a bar code (commodity code) applied to a commodity has been developed and are disclosed in various publications including, for example, Japanese Patent Laid-Open Applications No. Showa 63-145591, No. Heisei 2-277412 and No. Heisei 5-81559.

In a POS system which employs a shopping cart or a shopping basket of the type mentioned, a customer itself reads a bar code applied to a commodity to be purchased by means of the scanner to register the commodity code information and places or accommodates the commodity into an accommodating section of the shopping cart or the shopping basket, and then after selection of commodities to be purchased is completed, the commodities are placed into the shopping cart or the shopping basket and transported to a settlement POS terminal.

Then at the settlement POS terminal, the commodity code information (or commodity price information corresponding to the commodity code information) registered by the customer itself is loaded down by radio or some other suitable means, and a total amount of money of the purchased commodities is calculated based on the commodity code information (commodity price information) to effect settlement of the accounts.

With the POS system, an operator no more need read the commodity codes of commodities one by one, and the time (register operation time) required for reading processing and settling processing can be reduced significantly. Consequently, the customer need not wait for a long time any more and also the burden on the operator can be reduced remarkably.

With the conventional POS system described above, however, upon settlement of accounts at a settlement POS terminal, a customer must transfer information of commodity codes which have been registered by the customer itself or commodity price information corresponding to such commodity code information by wireless or by some other suitable means from a self scanning cart or a shopping basket or a like member having a self scanning function to the settlement POS terminal. Accordingly, the conventional POS system has a subject to be solved in that much time is required for accessing for such data transfer processing, which makes a factor of an increase of the settlement time, and the reliability is not satisfactory in that data may not possibly be transferred completely.

SUMMARY OF THE INVENTION

It is an object of the present invention to provide a POS system wherein the access time for transfer of data is reduced to reduce the time required for settlement of accounts and complete transfer of data is assured to enhance the reliability.

In order to attain the object described above, according to an aspect of the present invention, there is provided a POS system which comprises a purchased commodity accommodating and transporting apparatus having a self scanning function and including a commodity code reading section for reading a commodity code applied to a commodity and an accommodation section for accommodating therein a commodity whose commodity code has been read by the commodity code reading section, a settlement POS terminal for performing final settlement of accounts for purchased commodities accommodated in the accommodation section of the purchased commodity accommodating and transporting apparatus, a two-dimensional bar code printing section provided on the purchased commodity accommodating and transporting apparatus for printing commodity code information read by the commodity code reading section as a two-dimensional bar code, a two-dimensional bar code reading section provided on the settlement POS terminal for reading the two-dimensional bar code printed by the two-dimensional bar code printing section of the purchased commodity accommodating and transporting apparatus, a price retrieval section provided on the settlement POS terminal for retrieving prices of commodities accommodated in the accommodation section of the purchased commodity accommodating and transporting apparatus in accordance with the two-dimensional bar code information read by the two-dimensional bar code reading section, and a totalization section provided on the settlement POS terminal for performing final settlement of accounts for the purchased commodities accommodated in the accommodation section of the purchased commodity accommodating and transporting apparatus in accordance with a result of the retrieval by the price retrieval section.

The price retrieval section may refer to a commodity information file, in which price information of the commodities corresponding to the commodity code information is stored as commodity information, to retrieve prices of the commodities. In this instance, the commodity information file may be provided in the settlement POS terminal or alternatively in an upper control apparatus which controls the settlement POS terminal.

According to another aspect of the present invention, there is provided a POS system which comprises a purchased commodity accommodating and transporting apparatus having a self scanning function and including a commodity code reading section for reading a commodity code applied to a commodity and an accommodation section for accommodating therein a commodity whose commodity code has been read by the commodity code reading section, a settlement POS terminal for performing final settlement of accounts for purchased commodities accommodated in the accommodation section of the purchased commodity accommodating and transporting apparatus, a price retrieval section provided in the purchased commodity accommodating and transporting apparatus for retrieving prices of the commodities accommodated in the accommodation section of the purchased commodity accommodating and transporting apparatus in accordance with commodity code information read by the commodity code reading section, a calculation section provided in the purchased commodity accommodating and transporting apparatus for calculating a total value of the prices of the commodities in accordance with a result of the retrieval by the price retrieval section, a detailed log production section provided on the purchased commodity accommodating and transporting apparatus for producing a detailed log of the purchased commodities in accordance with the result of the retrieval by the price retrieval section and a result of the calculation by the calculation section, a two-dimensional bar code printing section provided on the purchased commodity accommodating and transporting apparatus for printing the detailed log produced by the detailed log production section as a two-dimensional bar code, a two-dimensional bar code reading section provided on the settlement POS terminal for reading the two-dimensional bar code printed by the two-dimensional bar code printing section of the purchased commodity accommodating and transporting apparatus, and a totalization section provided on the settlement POS terminal for performing final settlement of accounts for the purchased commodities accommodated in the accommodation section of the purchased commodity accommodating and transporting apparatus in accordance with a result of the reading by the two-dimensional bar code reading section.

The price retrieval section may refer to a commodity information file, in which price information of the commodities corresponding to the commodity code information is stored as commodity information, to retrieve prices of the commodities. In this instance, the commodity information file may be provided on the purchased commodity accommodating and transporting apparatus or alternatively in an upper control apparatus which controls the purchased commodity accommodating and transporting apparatus.

According to a further aspect of the present invention, there is provided a POS system which comprises a purchased commodity accommodating and transporting apparatus having a self scanning function and including a commodity code reading section for reading a commodity code applied to a commodity and an accommodation section for accommodating therein a commodity whose commodity code has been read by the commodity code reading section, a settlement POS terminal for performing final settlement of accounts for purchased commodities accommodated in the accommodation section of the purchased commodity accommodating and transporting apparatus, a first price retrieval section provided in the purchased commodity accommodating and transporting apparatus for retrieving prices of the commodities accommodated in the accommodation section of the purchased commodity accommodating and transporting apparatus in accordance with commodity code information read by the commodity code reading section, a calculation section provided in the purchased commodity accommodating and transporting apparatus for calculating a total value of the prices of the commodities in accordance with a result of the retrieval by the first price retrieval section, a detailed log production section provided on the purchased commodity accommodating and transporting apparatus for producing a detailed log of the purchased commodities in accordance with the result of the retrieval by the first price retrieval section and a result of the calculation by the calculation section, a two-dimensional bar code printing section provided on the purchased commodity accommodating and transporting apparatus for printing the detailed log produced by the detailed log production section as a two-dimensional bar code, an error determination section provided on the purchased commodity accommodating and transporting apparatus for determining whether or not an error has occurred upon price retrieval by the first price retrieval section, a print contents switching section provided on the purchased commodity accommodating and transporting apparatus and operable when it is determined by the error determination section that an error has occurred for switching contents to be printed by the two-dimensional bar code printing section from the detailed log produced by the detailed log production section to the commodity code information read by the commodity code reading section, a two-dimensional bar code reading section provided on the settlement POS terminal for reading the two-dimensional bar code printed by the two-dimensional bar code printing section of the purchased commodity accommodating and transporting apparatus, a print contents determination section provided on the settlement POS terminal for determining whether a result of the reading by the two-dimensional bar code reading section is a detailed log or commodity code information, a second price retrieval section provided on the settlement POS terminal and operable when it is determined by the print contents determination section that the printed contents are commodity code information for retrieving prices of the commodities accommodated in the accommodation section of the purchased commodity accommodating and transporting apparatus in accordance with the two-dimensional bar code information read by the two-dimensional bar code reading section, and a totalization section provided on the settlement POS terminal and operable when it is determined by the print contents determination section that the printed contents are commodity code information for performing final settlement of accounts for the purchased commodities accommodated in the accommodation section of the purchased commodity accommodating and transporting apparatus in accordance with a result of the retrieval by the second price retrieval section but operable when it is determined by the print contents determination section that the printed contents are a detailed log for performing final settlement of accounts for the purchased commodities in accordance with the result of the reading by the two-dimensional bar code reading section.

The first price retrieval section may refer to a commodity information file, in which price information of the commodities corresponding to the commodity code information is stored as commodity information, to retrieve prices of the commodities. In this instance, the commodity information file may be provided on the purchased commodity accommodating and transporting apparatus or alternatively in an upper control apparatus which controls the purchased commodity accommodating and transporting apparatus.

The second price retrieval section may refer to a commodity information file, in which price information of the commodities corresponding to the commodity code information is stored as commodity information, to retrieve prices of the commodities. In this instance, the commodity information file may be provided in the settlement POS terminal or alternatively in an upper control apparatus which controls the settlement POS terminal.

With the POS system described above, the following effects or advantages are achieved:

1. The access time for data transfer processing between the purchased commodity accommodating and transporting apparatus and the settlement POS terminal upon settlement of accounts can be reduced remarkably, and consequently, the time for settlement of accounts can be reduced. Further, incomplete transfer of data, which possibly occurs with conventional radio transmission, is eliminated, and enhancement of the reliability can be realized.

2. Since detailed data are transferred at a time to the settlement POS terminal, the settlement POS terminal need not perform price retrieval processing any more, and consequently, the settlement time can be further reduced.

3. When a retrieval error occurs upon price retrieval by the purchased commodity accommodating and transporting apparatus, information of a two-dimensional bar code to be printed by the two-dimensional bar code printing section is automatically switched to commodity code information so that price retrieval processing based on the commodity code information is performed by the settlement POS terminal. Consequently, the burden to the upper control section can be reduced.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENTS a. Aspects of the Invention

Figure 1:
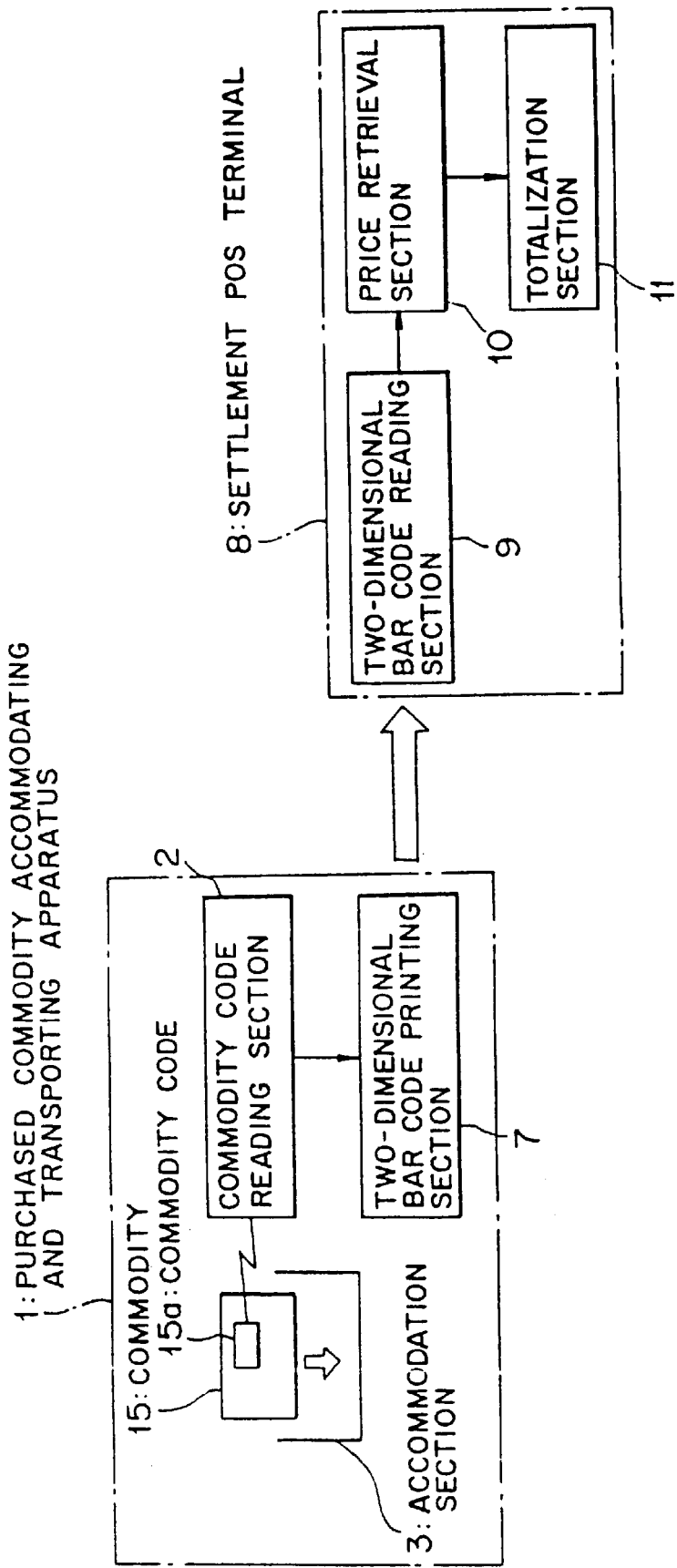
FIG. 1 is a block diagram illustrating a first aspect of the present invention.

Referring first to FIG. 1, there is illustrated an aspect of the present invention. The aspect illustrated is directed to a POS system which includes at least one purchased commodity accommodating and transporting apparatus 1 (only one is shown in FIG. 1) having a self scanning function, and at least one settlement POS terminals 8 for performing final settlement of accounts for purchased commodity. The purchased commodity accommodating and transporting apparatus 1 includes a commodity code reading section 2 for reading a commodity code 15a applied to a commodity 15, an accommodation section 3 for accommodating therein a commodity 15 whose commodity code 15a has been read by the commodity code reading section 2, and a two-dimensional bar code printing section 7 for printing commodity code information read by the commodity code reading section 2 as a two-dimensional bar code.

Meanwhile, the settlement POS terminal 8 includes a two-dimensional bar code reading section 9 for reading a two-dimensional bar code printed by the two-dimensional bar code printing section 7 of the purchased commodity accommodating and transporting apparatus 1, a price retrieval section 10 for retrieving prices of commodities 15 accommodated in the accommodation section 3 of the purchased commodity accommodating and transporting apparatus 1 in accordance with two-dimensional bar code information read by the two-dimensional bar code reading section 9, and a totalization section 11 for performing final settlement of accounts for the purchased commodities accommodated in the accommodation section 3 of the purchased commodity accommodating and transporting apparatus 1 in accordance with a result of the retrieval by the price retrieval section 10.

The price retrieval section 10 refers to a commodity information file, in which price information of commodities 15 corresponding to commodity code information is stored as commodity information, to retrieve prices of the commodities 15. The commodity information file may be provided in the settlement POS terminal 8 or alternatively in an upper control apparatus which controls the settlement POS terminal 8.

In the POS system described above with reference to FIG. 1, while carrying the purchased commodity accommodating and transporting apparatus 1, a customer itself reads a commodity code 15a applied to a commodity 15 to be purchased by means of the commodity code reading section 2 and accommodates the commodity 15 into the accommodation section 3. Then, after shopping is completed, the customer moves to the settlement POS terminal 8. Thereupon, on the purchased commodity accommodating and transporting apparatus 1, commodity code information of commodities read by the commodity code reading section 2 is printed as a two-dimensional bar code by the two-dimensional bar code printing section 7.

Then, at the settlement POS terminal 8, the two-dimensional bar code printed by the two-dimensional bar code printing section 7 of the purchased commodity accommodating and transporting apparatus 1 is read by the two-dimensional bar code reading section 9, and the prices of the commodities 15 accommodated in the accommodation section 3 of the purchased commodity accommodating and transporting apparatus 1 are retrieved by the price retrieval section 10 in accordance with the thus read two-dimensional bar code information. Then, final settlement of accounts for the purchased commodities accommodated in the accommodation section 3 of the purchased commodity accommodating and transporting apparatus 1 is performed by the totalization section 11 in accordance with a result of the retrieval.

Figure 2:
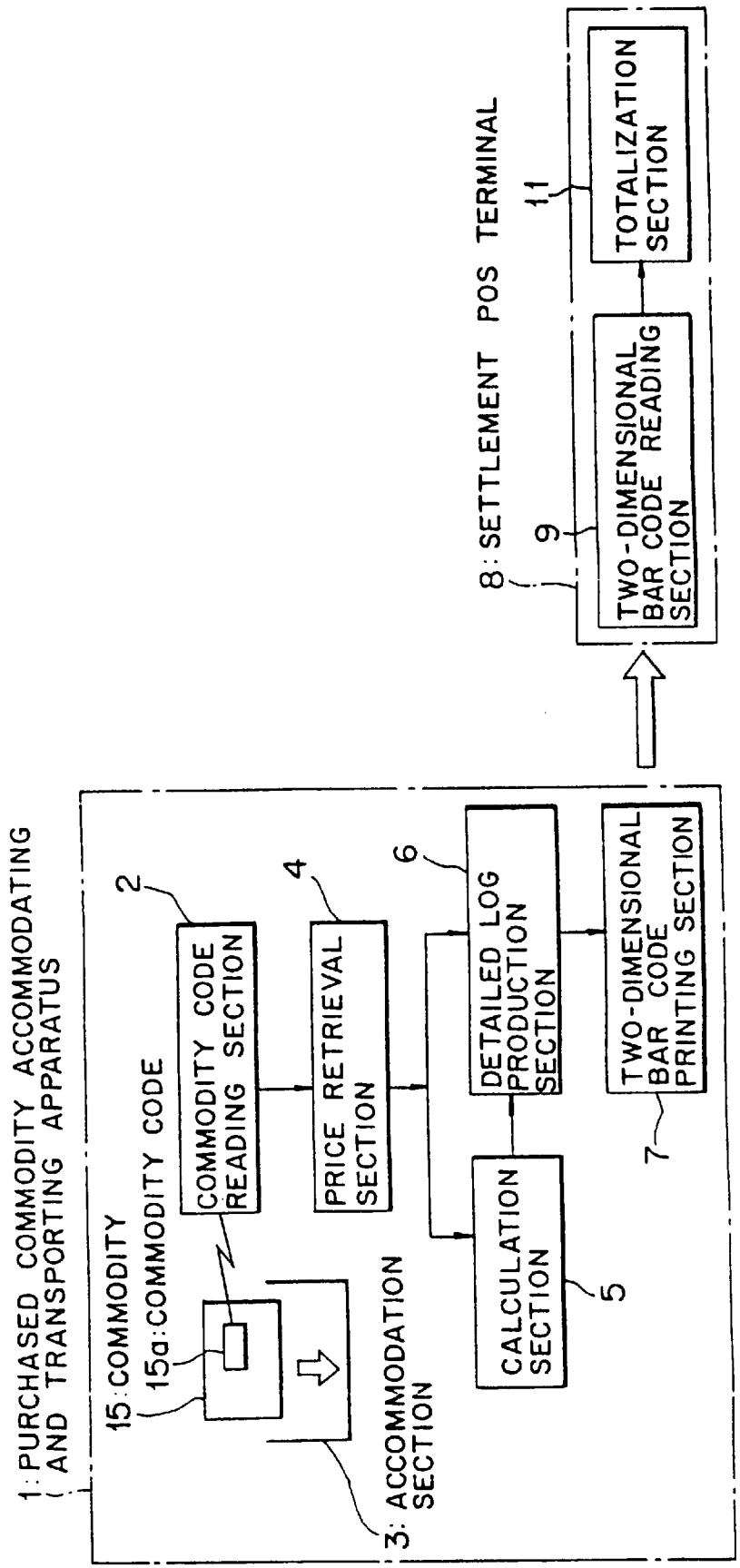
FIG. 2 is a similar view but illustrating a second aspect of the present invention.

Referring now to FIG. 2, there is illustrated another aspect of the present invention. Also the aspect illustrated is directed to a POS system which includes a purchased commodity accommodating and transporting apparatus 1 having a self scanning function and a settlement POS terminal 8 for performing final settlement of accounts for purchased commodities. According to the present aspect, however, the purchased commodity accommodating and transporting apparatus 1 includes, in addition to a commodity code reading section 2 and an accommodation section 3 similar to those of the first aspect described above, a price retrieval section 4, a calculation section 5, a detailed log production section 6, and a two-dimensional bar code printing section 7.

The price retrieval section 4 retrieves prices of commodities 15 accommodated in the accommodation section 3 of the purchased commodity accommodating and transporting apparatus 1 in accordance with commodity code information read by the commodity code reading section 2. The calculation section 5 calculates a total value of the prices of commodities 15 in accordance with a result of retrieval by the price retrieval section 4. The detailed log production section 6 produces a detailed log of purchased commodities in accordance with a result of retrieval by the price retrieval section 4 and a result of calculation by the calculation section 5. The two-dimensional bar code printing section 7 prints a detailed log produced by the detailed log production section 6 as a two-dimensional bar code.

Meanwhile, the settlement POS terminal 8 includes a two-dimensional bar code reading section 9 for reading a two-dimensional bar code printed by the two-dimensional bar code printing section 7 of the purchased commodity accommodating and transporting apparatus 1, and a totalization section 11 for performing final settlement of accounts for the purchased commodities accommodated in the accommodation section 3 of the purchased commodity accommodating and transporting apparatus 1 in accordance with a result of reading by the two-dimensional bar code reading section 9.

The price retrieval section 4 refers to a commodity information file, in which price information of commodities 15 corresponding to commodity code information is stored as commodity information, to retrieve prices of the commodities 15. The commodity information file may be provided on the purchased commodity accommodating and transporting apparatus 1 or alternatively in an upper control apparatus which controls the purchased commodity accommodating and transporting apparatus 1.

In the POS system described above with reference to FIG. 2, while carrying the purchased commodity accommodating and transporting apparatus 1, a customer itself reads a commodity code 15a applied to a commodity 15 to be purchased by means of the commodity code reading section 2 and accommodates the commodity 15 into the accommodation section 3. Then, after shopping is completed, the customer moves to the settlement POS terminal 8.

Thereupon, on the purchased commodity accommodating and transporting apparatus 1, the prices of commodities 15 accommodated in the accommodation section 3 of the purchased commodity accommodating and transporting apparatus 1 are retrieved by the price retrieval section 4 in accordance with the commodity code information from the commodity code reading section 2, and totalization calculation of the prices of the commodities 15 is performed by the calculation section 5 in accordance with a result of the retrieval.

Then, a detailed log of the purchased commodities is produced by the detailed log production section 6 in accordance with the result of the retrieval by the price retrieval section 4 and a result of the calculation by the calculation section 5, and the detailed log is printed as a two-dimensional bar code by the two-dimensional bar code printing section 7.

Then, at the settlement POS terminal 8, the two-dimensional bar code printed by the two-dimensional bar code printing section 7 of the purchased commodity accommodating and transporting apparatus 1 is read by the two-dimensional bar code reading section 9, and final settlement of accounts for the purchased commodities accommodated in the accommodation section 3 of the purchased commodity accommodating and transporting apparatus 1 is performed by the totalization section 11 in accordance with a result of the reading.

Figure 3:
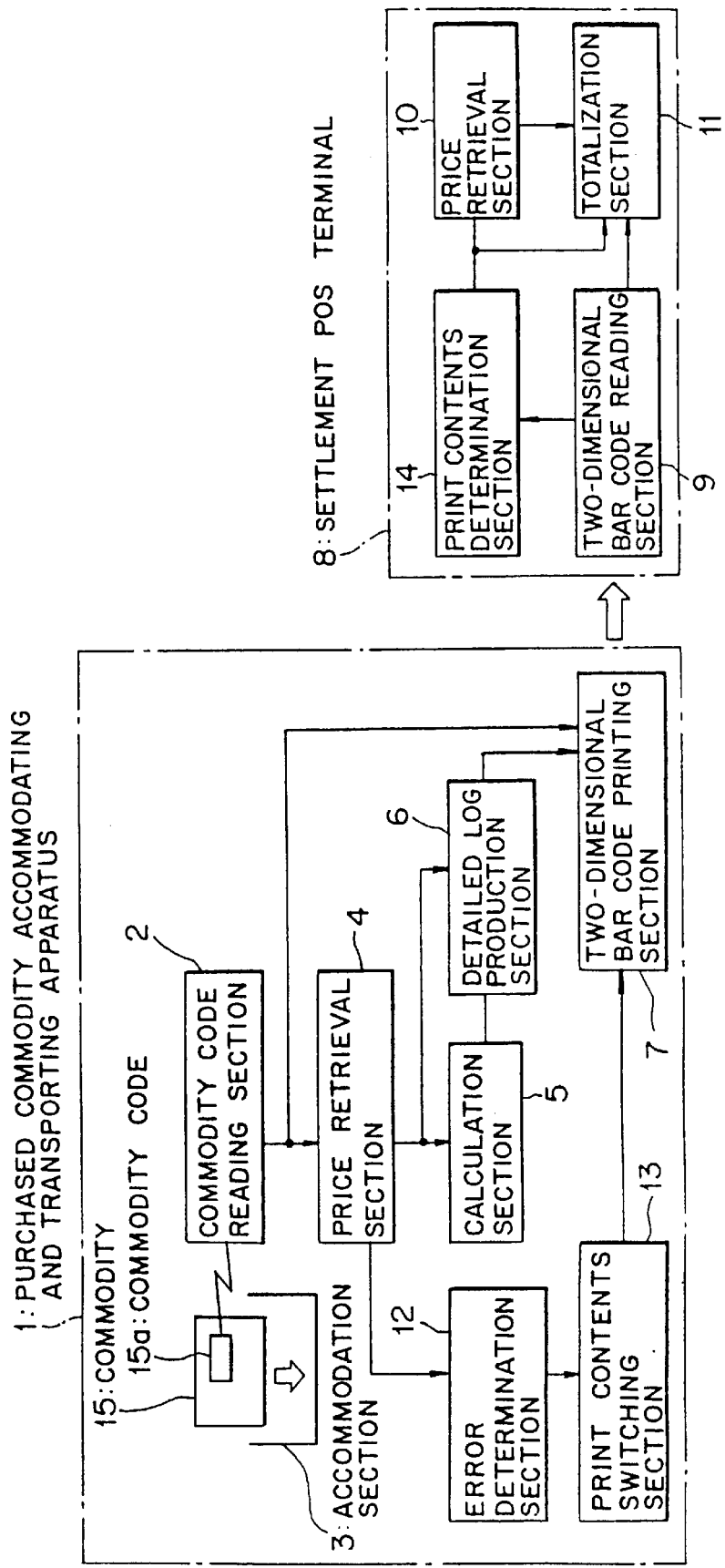
FIG. 3 is a similar view but illustrating a third aspect of the present invention.

Referring now to FIG. 3, there is illustrated a further aspect of the present invention. Also the aspect illustrated is directed to a POS system which includes a purchased commodity accommodating and transporting apparatus 1 having a -self scanning function and a settlement POS terminal 8 for performing final settlement of accounts for purchased commodities. According to the present aspect, however, the purchased commodity accommodating and transporting apparatus 1 includes an error determination section 12 and a print contents switching section 13 in addition to a commodity code reading section 2, an accommodation section 3, a price retrieval section (first price retrieval section) 4, a calculation section 5, a detailed log calculation section 6 and a two-dimensional bar code printing section 7 similar to those of the second aspect described above with reference to FIG. 2.

The error determination section 12 determines whether or not an error has occurred upon price retrieval by the first price retrieval section 4. The print contents switching section 13 switches, when it is determined by the error determination section 12 that an error has occurred, contents to be printed by the two-dimensional bar code printing section 7 from the detailed log produced by the detailed log production section 6 to the commodity code information read by the commodity code reading section 2.

Meanwhile, the settlement POS terminal 8 includes a two-dimensional bar code reading section 9, a print contents determination section 14, a price retrieval section (second price retrieval section) 10, and a totalization section 11.

The two-dimensional bar code reading section 9 reads a two-dimensional bar code printed by the two-dimensional bar code printing section 7 of the purchased commodity accommodating and transporting apparatus 1. The print contents determination section 14 determines whether a result of reading by the two-dimensional bar code reading section 9 is a detailed log or commodity code information. The price retrieval section 10 retrieves, when it is determined by the print contents determination section 14 that the printed contents are commodity code information, prices of commodities 15 accommodated in the accommodation section 3 of the purchased commodity accommodating and transporting apparatus 1 in accordance with two-dimensional bar code information read by the two-dimensional bar code reading section 9.

The totalization section 11 performs, when it is determined by the print contents determination section 14 that the printed contents are commodity code information, final settlement of accounts for the purchased commodities accommodated in the accommodation section 3 of the purchased commodity accommodating and transporting apparatus 1 in accordance with a result of the retrieval by the price retrieval section 10, but performs, when it is determined by the print contents determination section 14 that the printed contents are a detailed log, final settlement of accounts for the purchased commodities in accordance with a result of the reading by the two-dimensional bar code reading section 9.

The price retrieval section 4 refers to a commodity information file, in which price information of the commodities 15 corresponding to the commodity code information is stored as commodity information, to retrieve prices of the commodities 15. The commodity information file may be provided on the purchased commodity accommodating and transporting apparatus 1 or alternatively in an upper control apparatus which controls the purchased commodity accommodating and transporting apparatus 1.

Also the price retrieval section 10 refers to a commodity information file, in which price information of the commodities 15 corresponding to the commodity code information is stored as commodity information, to retrieve prices of the commodities 15. The commodity information file may be provided in the settlement POS terminal 8 or alternatively in an upper control apparatus which controls the settlement POS terminal 8.

In the POS system described above with reference to FIG. 3, while carrying the purchased commodity accommodating and transporting apparatus 1, a customer itself reads a commodity code 15a applied to a commodity 15 to be purchased by means of the commodity code reading section 2 and accommodates the commodity 15 into the accommodation section 3. Then, after shopping is completed, the customer moves to the settlement POS terminal 8.

Thereupon, on the purchased commodity accommodating and transporting apparatus 1, the prices of commodities 15 accommodated in the accommodation section 3 of the purchased commodity accommodating and transporting apparatus 1 are retrieved by the price retrieval section 4 in accordance with the commodity code information from the commodity code reading section 2, and totalization calculation of the prices of the commodities 15 is performed by the calculation section 5 in accordance with a result of the retrieval.

Then, a detailed log of the purchased commodities is produced by the detailed log production section 6 in accordance with the result of the retrieval by the price retrieval section 4 and a result of the calculation by the calculation section 5, and the detailed log is printed as a two-dimensional bar code by the two-dimensional bar code printing section 7.

If a retrieval error occurs during the price retrieval processing by the price retrieval section 4, the error is detected by the error determination section 12. Consequently, contents to be printed by the two-dimensional bar code printing section 7 are switched by the print contents switching section 13 from the detailed log produced by the detailed log production section 6 to the commodity code information read by the commodity code reading section 2.

At the settlement POS terminal 8, the two-dimensional bar code printed by the two-dimensional bar code printing section 7 of the purchased commodity accommodating and transporting apparatus 1 is read by the two-dimensional bar code reading section 9, and whether a result of the reading is a detailed log or commodity code information is determined by the print contents determination section 14.

When it is determined that the result of the reading is commodity code information, the prices of the commodities 15 accommodated in the accommodation section 3 of the purchased commodity accommodating and transporting apparatus 1 are retrieved by the price retrieval section 10 in accordance with two-dimensional bar code information from the two-dimensional bar code reading section 9, and final settlement of accounts for the purchased commodities accommodated in the accommodation section 3 of the purchased commodity accommodating and transporting apparatus 1 is performed by the totalization section 11 in accordance with a result of the retrieval.

On the contrary when it is determined by the print contents determination section 14 that the result of the reading is a detailed log, final settlement of accounts for the purchased commodities accommodated in the accommodation section 3 of the purchased commodity accommodating and transporting apparatus 1 is performed by the totalization section 11 in accordance with the result of the reading from the two-dimensional bar code reading section 9.

Accordingly, with the POS systems of the aspect of the present invention, the access time for data transfer processing between the purchased commodity accommodating and transporting apparatus 1 and the settlement POS terminal 8 upon settlement of accounts can be reduced remarkably, and consequently, the time for settlement of accounts can be reduced. Further, incomplete transfer of data, which possibly occurs with conventional radio transmission, is eliminated, and enhancement of the reliability can be realized.

Further, since detailed data are transferred at a time to the settlement POS terminal 8, the settlement POS terminal need not perform price retrieval processing any more, and consequently, the settlement time can be further reduced.

Furthermore, when a retrieval error occurs upon price retrieval by the purchased commodity accommodating and transporting apparatus, information of a two-dimensional bar code to be printed by the two-dimensional bar code printing section 7 is automatically switched to commodity code information so that price retrieval processing based on the commodity code information is performed by the settlement POS terminal 8. Consequently, the burden to the upper control section can be reduced.

b. First Embodiment

Figure 6:
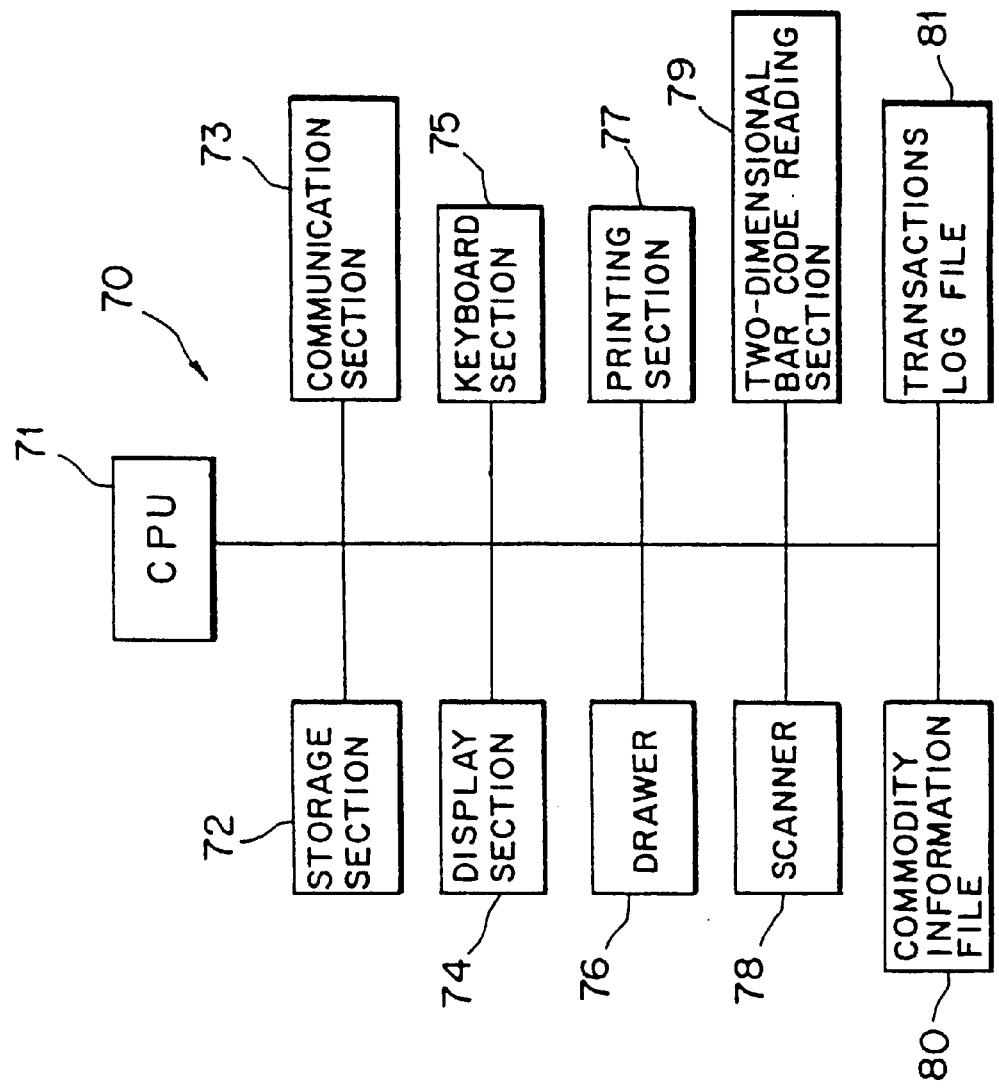
FIG. 6 is a block diagram showing a hardware construction of a settlement POS terminal employed in the POS system shown in FIG. 4.
Figure 7:
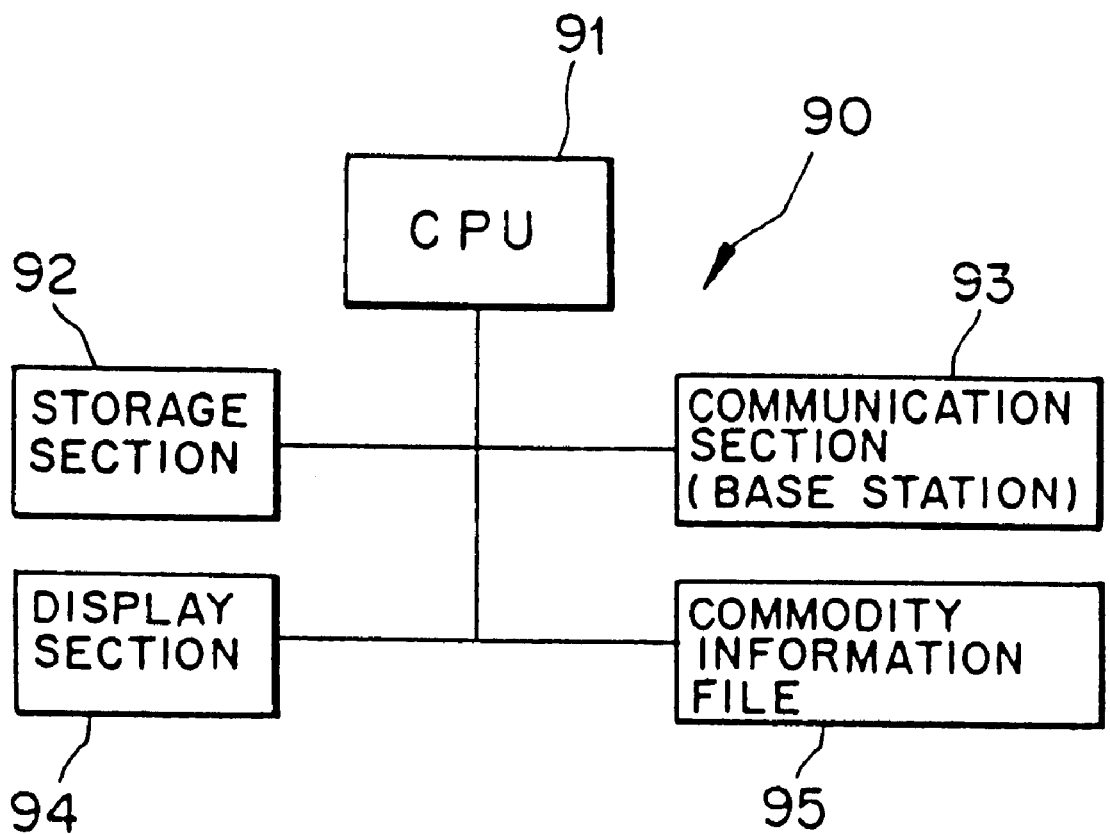
FIG. 7 is a block diagram showing a hardware construction of an upper control section employed in the POS system shown in FIG. 4.
Figure 8:
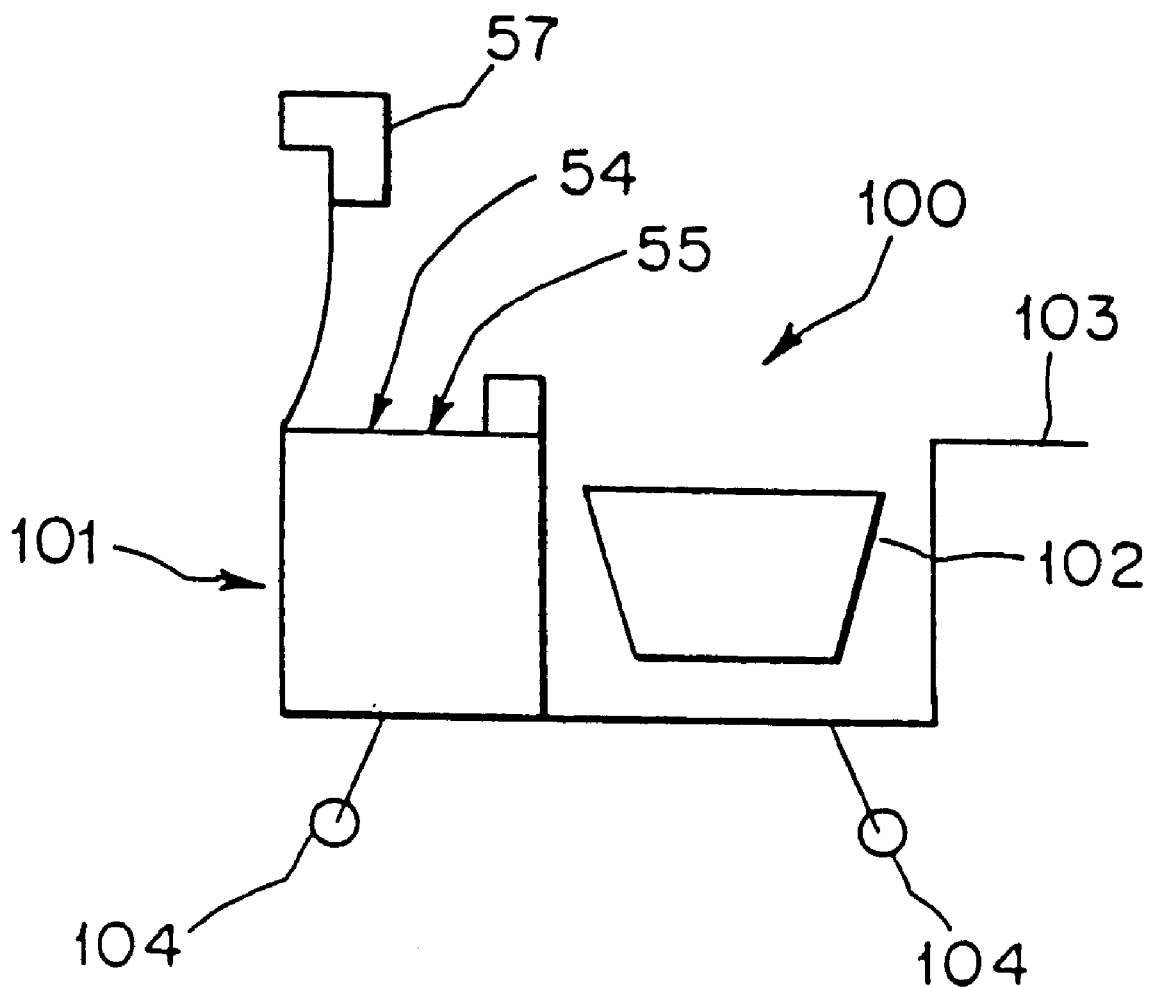
FIG. 8 is a schematic view showing a general construction of the purchased commodity accommodating and transporting apparatus shown in FIG. 5.

Referring first to FIGS. 4 to 10, there is shown a POS system according to a first preferred embodiment of the present invention. The POS system of the present embodiment as well as another POS system of the second embodiment, which will be hereinafter described, commonly employ such a self scanning cart (shopping cart having a self scanning function) 100 as shown in FIG. 8 as a purchased commodity accommodating and transporting apparatus.

Referring first to FIG. 8, the scanning cart 100 includes a cart section 101 and a basket member 102 which serves as an accommodation section.

The cart section 101 is constructed so as to receive the basket member 102 thereon and includes a handle section 103 for being grasped by a using person such as a customer, and four roller members 104 provided for rotation on the bottom of the cart section 101. Accordingly, a customer can accommodate commodities to be purchased into the basket member 102 while freely moving the cart section 101 on which the basket member 102 is placed by grasping and pushing the handle section 103 to rotate the roller members 104.

The cart section 101 further includes, as hereinafter described in detail with reference also to FIGS. 4 and 5, a scanner 57 for reading a bar code (commodity code) 50a applied to a commodity 50 as well as a display section 54 for displaying various information, and a keyboard section 55 for inputting various information.

In a POS system which employs the scanning cart 100 of the type described above, generally a customer itself reads a bar code 50a applied to each commodity 50 to be purchased by means of the scanner 57 to register the commodity code information, places or accommodates such commodities 50 into the basket member 102, depresses, after selection of commodities to be purchased is completed, an end key (not shown) on the keyboard section 55, and carries them to a settlement POS terminal 70 (which will be hereinafter described with reference to FIGS. 4 and 6) with the commodities loaded on the scanning cart 100.

Figure 4:
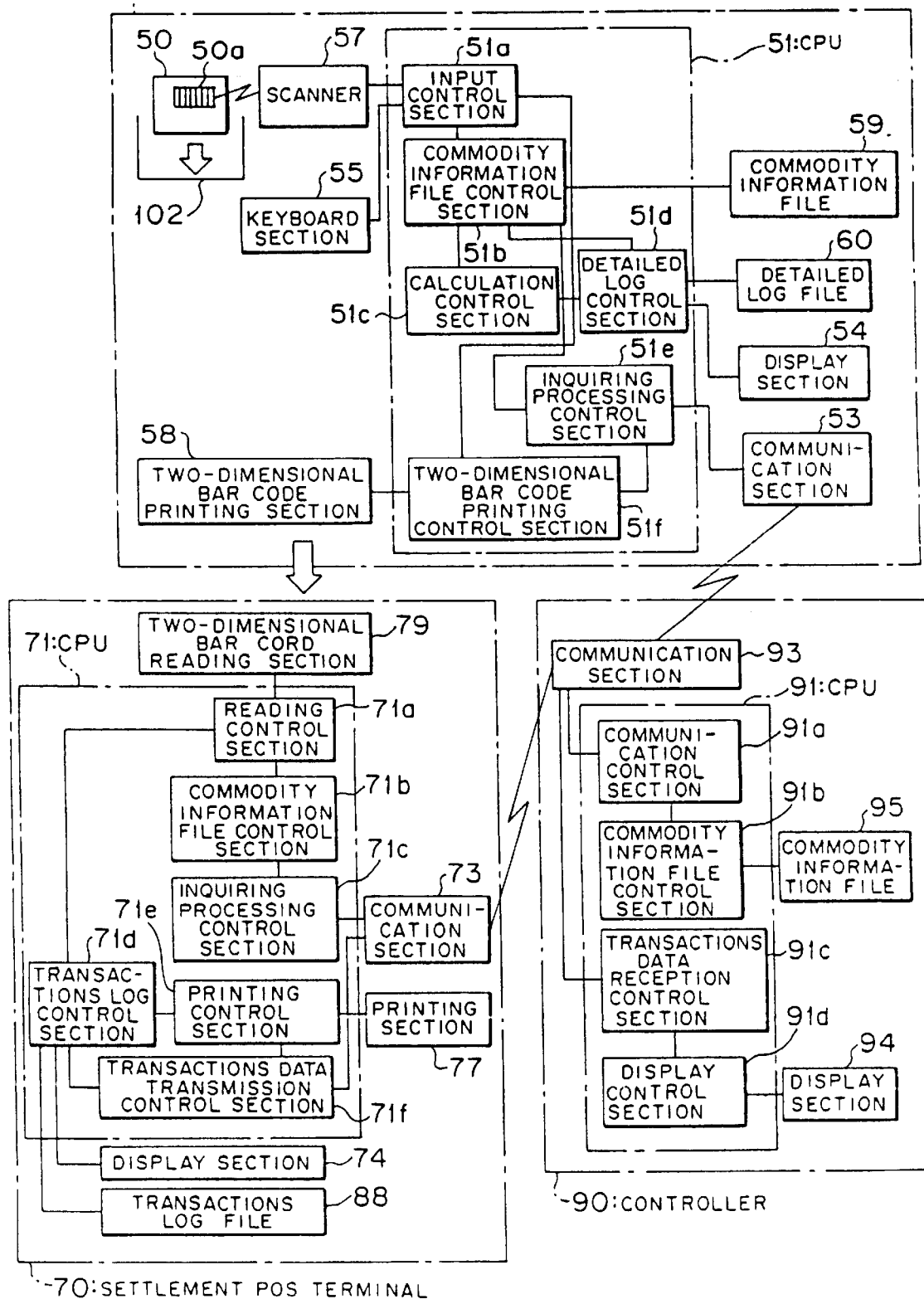
FIG. 4 is a block diagram showing a functional construction of a POS system according to a first preferred embodiment of the present invention.

Referring now to FIG. 4, the POS system of the first embodiment of the present invention includes at least one self scanning cart 100, at least one settlement POS terminal 70, and a controller (upper control section) 90. The self scanning cart 100, the settlement POS terminal 70 and the controller 90 have such hardware constructions as shown in FIGS. 5 to 7, respectively.

Figure 5:
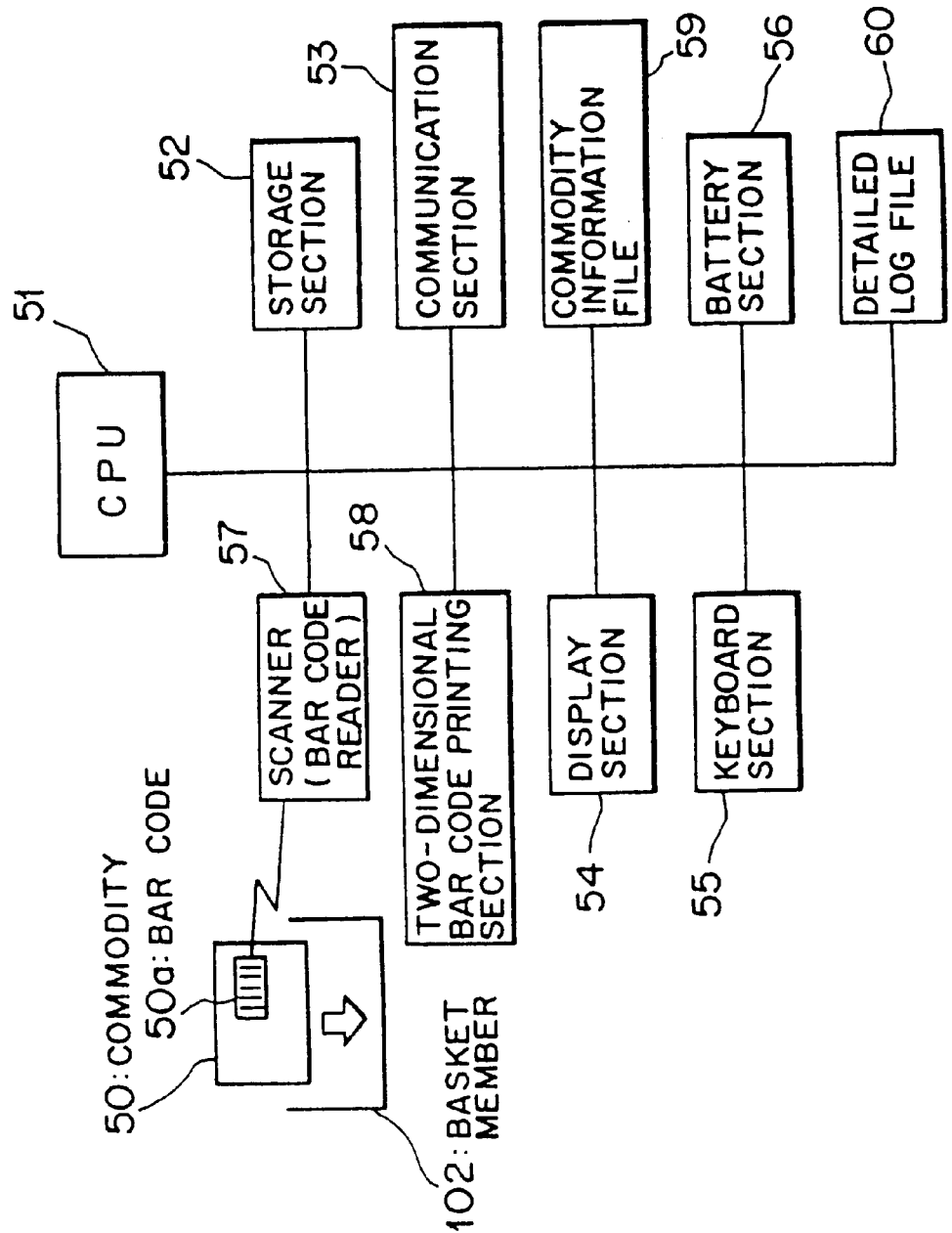
FIG. 5 is a block diagram showing a hardware construction of a control system of a purchased commodity accommodating and transporting apparatus employed in the POS system shown in FIG. 4.

Referring first to FIG. 5, there is shown the hardware construction of a control system of the self scanning cart 100.

The control system shown includes a CPU (central processing unit) 51 for controlling the entire control system of the self scanning cart 100, a storage section 52 for storing a program and various data, and a communication section 53 for communicating data with the controller 90 by wireless (infrared rays or the like).

The control system further includes the display section 54 which displays various information (unit prices, a total amount of money and so forth as commodity information of scanned commodities 50), the keyboard section 55 which inputs various information, a battery section 56 for supplying power to the control system of the self scanning cart 100, and the scanner (bar code reader, commodity code reading section) 57 which optically reads a bar code (commodity code) 50a applied to a commodity 50.

The control system further includes a two-dimensional bar code printing section 58 for printing commodity code information (raw data of a bar code 50a, that is, an array of digits before price retrieval processing such as, for example, 49123456) read by the scanner 57 as a two-dimensional bar code, a commodity information file 59 which is used as a price lookup file and in which commodity numbers, commodity names, prices (unit prices) and so forth corresponding to commodity code information are stored, and a detailed log file 60 for storing a detail log produced by the CPU 51 as hereinafter described.

A two-dimensional bar code is a code of alphanumeric characters, kana characters, kanji characters and/or like characters, and has a recording capacity much greater than a one-dimensional bar code and allows coding of character information as it is. Therefore, data read from a two-dimensional bar code can be used as they are. Where such data are commodity information, no retrieval by an upper control system is required. Meanwhile, for example, "PDF417" is used as a two-dimensional bar code.

Referring now to FIG. 6, there is shown the hardware construction of the settlement POS terminal 70. The settlement POS terminal 70 includes a CPU 71 for controlling the entire settlement POS terminal 70, a storage section 72 for storing a program and various data, a communication section 73 for communicating data with the controller 90 by wireless (infrared rays or the like), a display section 74 for displaying various information (a receipt image of a result of settlement of accounts and so forth), a keyboard section 75 for inputting various information, and a drawer (drawer section) 73 for accommodating cash therein.

The settlement POS terminal 70 further includes a printing section 77 for issuing a result of settlement of accounts as a receipt, a scanner (bar code reader) 78 for reading a bar code 50a at the settlement POS terminal 70 when necessary, and a two-dimensional bar code reading section 79 for reading a two-dimensional bar code printed by the two-dimensional bar code reading section 58 of the self scanning cart 100.

The settlement POS terminal 70 further includes a commodity information file 80 which is used as a price lookup file similarly to the commodity information file 59 of the self scanning cart 100 and has commodity information such as commodity numbers, commodity names, prices (unit prices) and so forth stored therein corresponding to commodity code information, and a transactions log file 81 for storing a transactions log produced by the CPU 71 as hereinafter described.

Meanwhile, the controller 90 serves as an upper control section such as, for example, a station controller for controlling the self scanning cart 100 and the settlement POS terminal 70 and has such a hardware construction as shown in FIG. 7.

In particular, referring to FIG. 7, the controller 90 includes a CPU 91 for controlling the entire controller 90, a storage section 92 for storing a program and various data, a communication section 93 for communicating data with the self scanning cart 100 or the settlement POS terminal 70 by wireless (infrared rays or the like), a display section 94 for displaying various information, and a commodity information file 95 which is used as a price lookup file similarly to the commodity information file 59 of the self scanning cart 100 and has commodity information such as commodity numbers, commodity names, prices (unit prices) and so forth stored therein corresponding to commodity code information.

The POS system in the present embodiment is functionally constructed in such a manner as shown in FIG. 4 from the self scanning cart 100, the settlement POS terminal 70, and the controller 90 described above.

In particular, referring to FIG. 4, the CPU 51 of the self scanning cart 100 has functions as an input control section 51a, a commodity information file control section 51b, a calculation control section 51c, a detailed log control section 51d, an inquiring processing control section 51e, and a two-dimensional bar code printing control section 51f.

The input control section 51a performs input control to read key input data from the keyboard 55 and commodity code information read by the scanner 57 into the CPU 51.

The commodity information file control section (first price retrieval section) 51b retrieves commodity numbers, commodity names, prices (unit prices) and so forth of commodities 50 accommodated in the basket member 102 of the self scanning cart 100 from the commodity information file 59 in accordance with commodity code information read by the scanner 57.

The calculation control section (calculation section) 51c performs totalization calculation of prices of commodities 50 in accordance with a result of retrieval by the commodity information file control section 51b. The detailed log control section (detailed. log production section) 51d produces a detailed log of purchased commodities in accordance with a result of retrieval by the commodity information file control section 51b and a result of calculation by the calculation control section 51c.

The inquiring processing control section 51e produces, when retrieval of the commodity information file 59 by the commodity information file control section 51b has failed to find out relevant data, an inquiring telegram having commodity code information (raw data of a bar code 50a) read by the scanner 57 and requests the controller 90 for retrieval of a price for the commodity code information, and then receives a result of such price retrieval by the controller 90.

An inquiring telegram produced by the inquiring processing control section 51e is transmitted to the controller 90 by way of the communication section 53. Meanwhile, a result of price retrieval by the controller 90 is received by the inquiring processing control section 51e by way of the communication section 53 and sent to the commodity information file control section 51b.

The two-dimensional bar code printing control section 51f edits commodity code information (raw data of bar codes 50a) read by the scanner 57 and inputted by way of the input control section 51a and controls the two-dimensional bar code printing section 58 to print the edited commodity data information as a two-dimensional bar code.

Meanwhile, the CPU 71 of the settlement POS terminal 70 has functions as a reading control section 71a, a commodity information file control section 71b, an inquiring processing control section 71c, a transactions log control section 71d, a printing control section 71e, and a transactions data transmission control section 71f.

The reading control section 71a performs input control to read two-dimensional bar code information read by the two-dimensional bar code reading section 79 into the CPU 71. The commodity information file control section (second price retrieval section) 71b retrieves commodity numbers, commodity names, prices (unit prices) and so forth of commodities 50 accommodated in the basket member 102 of the self scanning cart 100 from the commodity information file 80 in accordance with two-dimensional bar code information read by the two-dimensional bar code reading section 79.

The inquiring processing control section 71c has a function similar to that of the inquiring processing control section 51e of the self scanning cart 100, and produces, when retrieval of the commodity information file 80 by the commodity information file control section 71b has failed to find out relevant data, an inquiring telegram having information (raw data of a bar code 50a) of a commodity code for which retrieval has failed and requests the controller 90 for retrieval of a price for the commodity code information, and then receives a result of such price retrieval by the controller 90.

An inquiring telegram produced by the inquiring processing control section 71c is transmitted to the controller 90 by way of the communication section 73. Meanwhile, a result of price retrieval by the controller 90 is received by the inquiring processing control section 71c by way of the communication section 73 and sent to the commodity information file control section 71b.

The transactions log control section (totalization section) 71d performs final settlement of accounts for purchased commodities accommodated in the basket member 102 of the self scanning cart 100 in accordance with a result of retrieval by the commodity information file control section 71b, produces a transactions log, and displays the transactions log as a receipt image on the display section 74 and stores the transactions log into the transactions log file 81.

The printing control section 71e controls the printing section 77 to print a transactions log produced by the transactions log control section 71d as a receipt. The transactions data transmission control section 71f transmits a transactions log produced by the transactions log control section 71d as transactions data to the controller 90 by way of the communication section 73.

On the other hand, the CPU 91 of the controller 90 has functions as a communication control section 91a, a commodity information file control section 91b, a transactions data reception control section 91c, and a display control section 91d.

The communication control section 91a controls communications of data (an inquiring telegram including commodity code information, a result of price retrieval and so forth) between the self scanning cart 100 and the settlement POS terminal 70 by way of the communication section 93. The commodity information file control section 91b retrieves a commodity number, a commodity name, a price (unit price) and so forth of a commodity 50 from the commodity information file 95 in accordance with commodity code information transmitted thereto by way of an inquiring telegram.

The transactions data reception control section 91c controls the communication section 93 to receive transactions data transmitted thereto from the settlement POS terminal 70 side. The display control section 91d controls the display section 94 to display transactions data from the settlement POS terminal 70 side received by the transactions data reception control section 91c.

Figure 9:
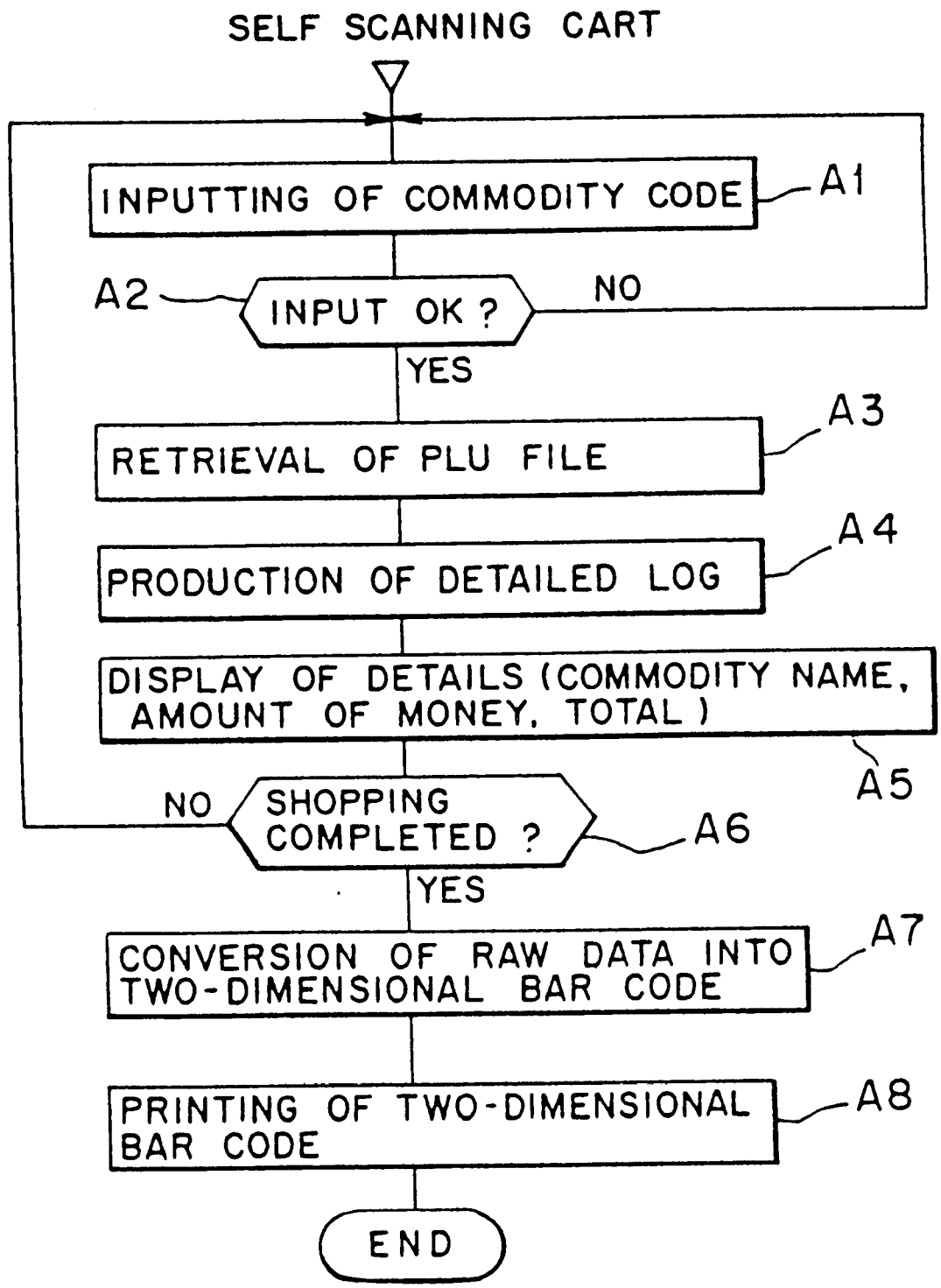
FIG. 9 is a flow chart illustrating operation of the purchased commodity accommodating and transporting apparatus shown in FIG. 5.

Operation of the POS system of the first embodiment of the present invention having the construction described above is illustrated in FIGS. 9 and 10. Referring first to FIG. 9, a customer itself will read a bar code 50a applied to a commodity 50 to be purchased by means of the scanner 57 and input the commodity code information (step A1). Then, if such inputting has been performed correctly (input OK, determination of YES at step A2), then the commodity information file control section 51b retrieves a commodity number, a commodity name, a price (unit price) and so forth of the commodity 50 from the commodity information file 59 in accordance with the commodity code information read by the scanner 57 and inputted from the input control section 51a (step A3).

In this instance, if the retrieval of the commodity information file 59 by the commodity information file control section 51b has failed to obtain relevant data, then the inquiring processing control section 51e produces an inquiring telegram having the commodity code information (raw data of the bar code 50a) read by the scanner 57 and requests the controller 90 for price retrieval in accordance with the commodity code information by way of the communication section 53. Then, on the controller 90 side, the inquiring telegram is received by way of the communication section 93 and the communication control section 91a, and the commodity information file control section 91b retrieves a commodity number, a commodity name, a price (unit price) and so forth of the commodity 50 from the commodity information file 95 in accordance with the commodity code information transmitted thereto by way of the inquiring telegram. A result of the retrieval is transmitted to the self scanning cart 100 side by way of the communication control section 91a and the communication section 93. On the self scanning cart 100 side, the result of the retrieval is received by the inquiring processing control section 51e by way of the communication section 53 and is sent as a result of price retrieval corresponding to the commodity code information to the commodity information file control section 51b. The sequence of price retrieval processes at step A3 described above is called local priority central price lookup (PLU).

Then, a total amount of money read in till now is calculated by the calculation control section 51c using the result of the price retrieval in accordance with the commodity code information read in from the scanner 57. A detailed log till now is produced by the detailed log control section 51d in accordance with a result of the calculation and results of price retrieval of the commodity code information read till now (step A4). The detailed log is stored into the detailed log file 60 and displayed in a receipt image on the display section 54 (step A5).

The processes at step A1 to A5 are repeated until the customer depresses the end key of the keyboard section 55 to effect inputting of ending of the use (step A6).

After the customer depresses the end key of the keyboard section 55 to end its shopping, the customer will move and transport the commodities carried on the self scanning cart 100 to the settlement POS terminal 70.

Thereupon, on the self scanning cart 100, the commodity code information (raw data of the bar codes 50a which are arrays of digits before price retrieval processing is performed) read by the scanner 57 and inputted by way of the input control section 51a is edited into a two-dimensional bar code by the two-dimensional bar code printing control section 51f (step A7). Then, the two-dimensional bar code is printed by the two-dimensional bar code printing section 58 (step A8).

Figure 10:
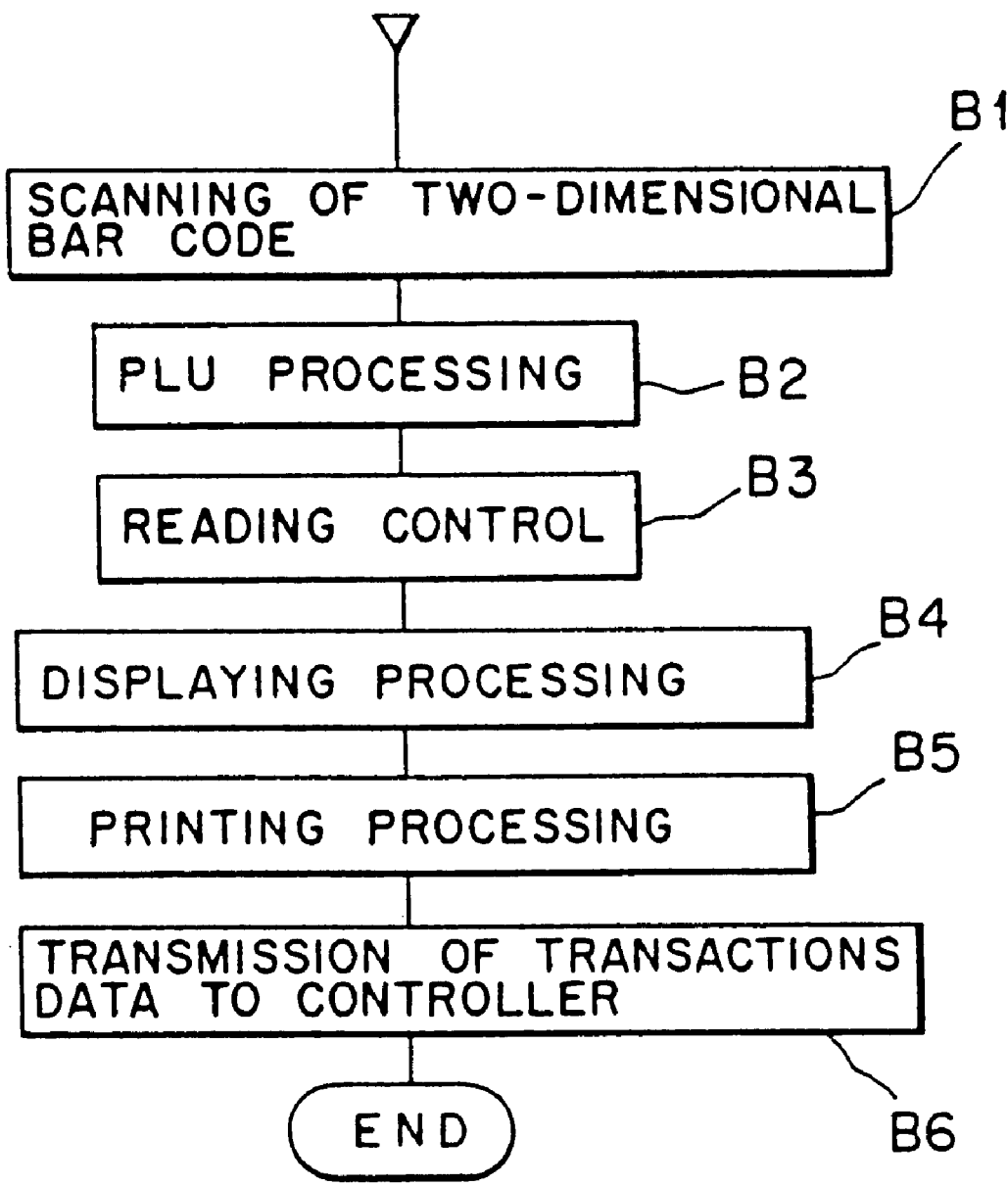
FIG. 10 is a flow chart illustrating operation of the settlement POS terminal shown in FIG. 6.

Referring now to FIG. 10, upon settlement of accounts at the settlement POS terminal 70, an operator of the settlement POS terminal 70 will receive the printed result of the two-dimensional bar code from the two-dimensional bar code printing section 58 of the self scanning cart 100 and read the two dimensional bar code by means of the two-dimensional bar code reading section 79 (step B1).

Then, commodity numbers, commodity names, prices (unit prices) and so forth of the commodities 50 are retrieved from the commodity information file 80 by the commodity information file control section 71b in accordance with the two-dimensional bar code information read by the two-dimensional bar code reading section 79 and inputted from the reading control section 71a (step B2).

In this instance, if the retrieval of the commodity information file 80 by the commodity information file control section 71b has failed to find out relevant data, the inquiring processing control section 71c produces an inquiring telegram having the commodity code information (raw data of a bar code 50a) read by the two-dimensional bar code reading section 79 and requests the controller 90 for price retrieval of the commodity code information by way of the communication section 73. Then, on the controller 90 side, the inquiring telegram is received by way of the communication section 93 and the communication control section 91a, and a commodity number, a commodity name, a price (unit price) and so forth of the commodity 50 are retrieved from the commodity information file 95 by the commodity information file control section 91b in accordance with the commodity code information transmitted thereto by way of the inquiring telegram. A result of the retrieval is transmitted to the settlement POS terminal 70 side by way of the communication control section 91a and the communication section 93. On the settlement POS terminal 70 side, the result of the retrieval is received by the inquiring processing control section 71c by way of the communication section 73 and transmitted as a result of price retrieval corresponding to the commodity code information to the commodity information file control section 71b.

The results of the price retrieval by the commodity information file control section 71b described above are successively read by the transactions log control section 71d (step B3), and final settlement of accounts for the purchased commodities accommodated in the basket member 102 of the self scanning cart 100 is performed by the transactions log control section 71d in accordance with the results of the retrieval read from the commodity information file control section 71b. In particular, a transactions log is produced and displayed in a receipt image on the display section 74 (step B4). Further, the transactions log is stored into the transactions log file 81 and printed as a receipt by the printing section 77 under the control of the printing control section 71e (step B5).

The transactions log produced by the transactions log control section 71d is transmitted as transactions data by way of the communication section 73 to the controller 90 under the control of the transactions data transmission control section 71f (step B6). Then, on the controller 90 side, the transactions data transmitted thereto from the settlement POS terminal 70 side are received by the transactions data reception control section 91c by way of the communication section 93 and displayed on the display section 94 under the control of the display control section 91d.

In this manner, with the POS system of the first embodiment of the present invention, if a customer scans and inputs the bar code 50a of a commodity 50 with the self scanning cart 100, then price retrieval (price lookup) processing is performed every time, and the price of the commodity and a total amount of money are displayed on the display section 54. Further, a detailed log is produced and stored into the detailed log file 60. On the other hand, upon settlement of accounts with the settlement POS terminal 70, two-dimensional bar code data (raw data of the bar code 50a) printed on and outputted from the self scanning cart 100 are read by the two-dimensional bar code reading section 79 of the settlement POS terminal 70 to perform price retrieval (price lookup) thereby to perform final settlement of accounts.

Accordingly, the access time for data transferring processing between the self scanning cart 100 and the settlement POS terminal 70 upon settlement of accounts is reduced significantly, and a commodity registering operation on a check-out lane is omitted, resulting in remarkable reduction of the check-out time (settlement time). Further, incomplete transmission of data, which may possibly occur in conventional radio transmission, is eliminated, and consequently, enhancement of the reliability can be realized.

It is to be noted that, while the commodity information file 59 is provided on the self scanning cart 100 in the first embodiment of the present invention described above, the commodity information file 59 may otherwise be omitted. In this instance, retrieval in accordance with commodity information is performed using the commodity information file 95 in the controller 90 by way of the communication section 53. Similar effects or advantages to those of the embodiment described above can be obtained also with the modified construction.

c. Second Embodiment

Figure 11:
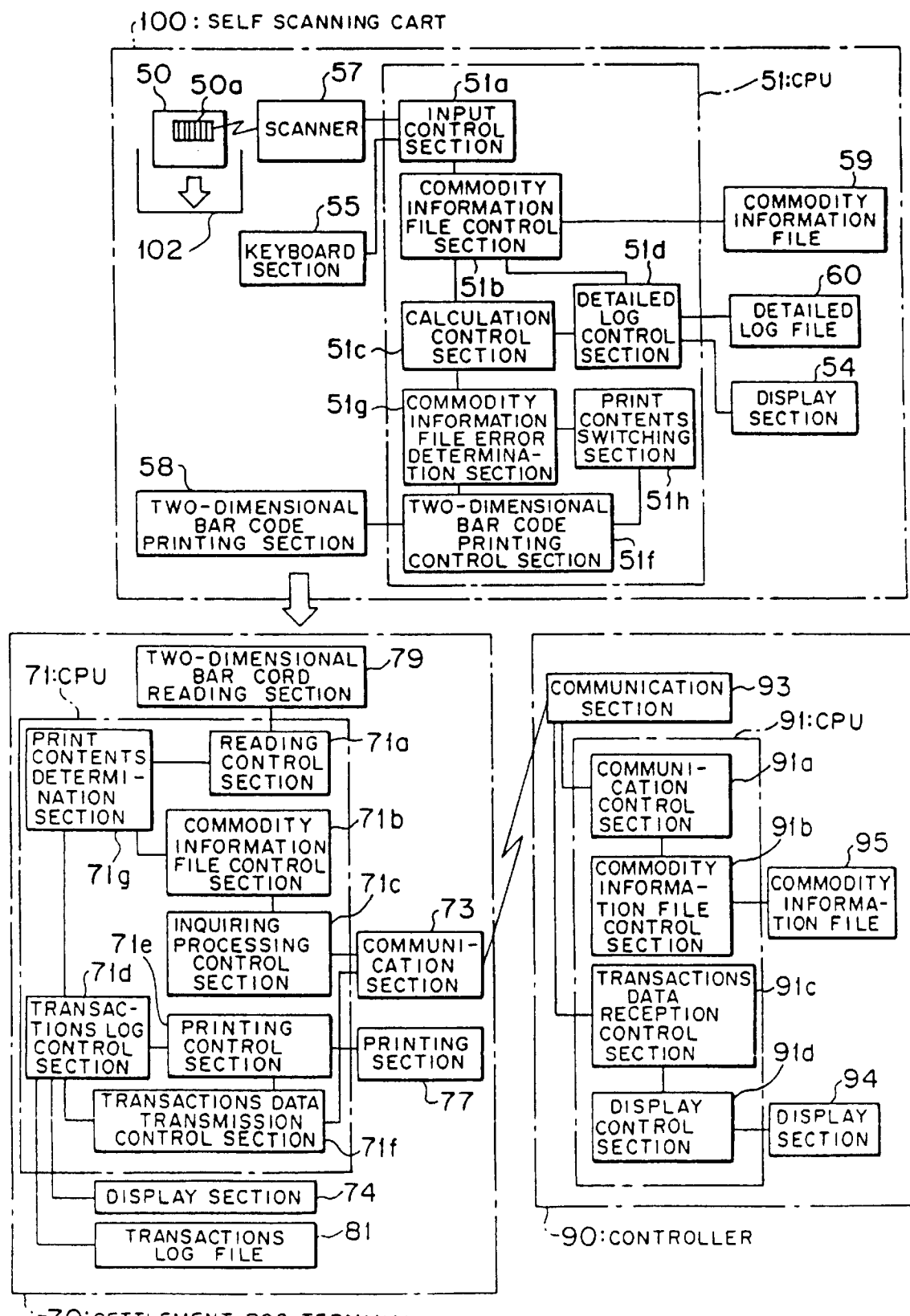
FIG. 11 is a block diagram showing a functional construction of a POS system according to a second preferred embodiment of the present invention.
Figure 12:
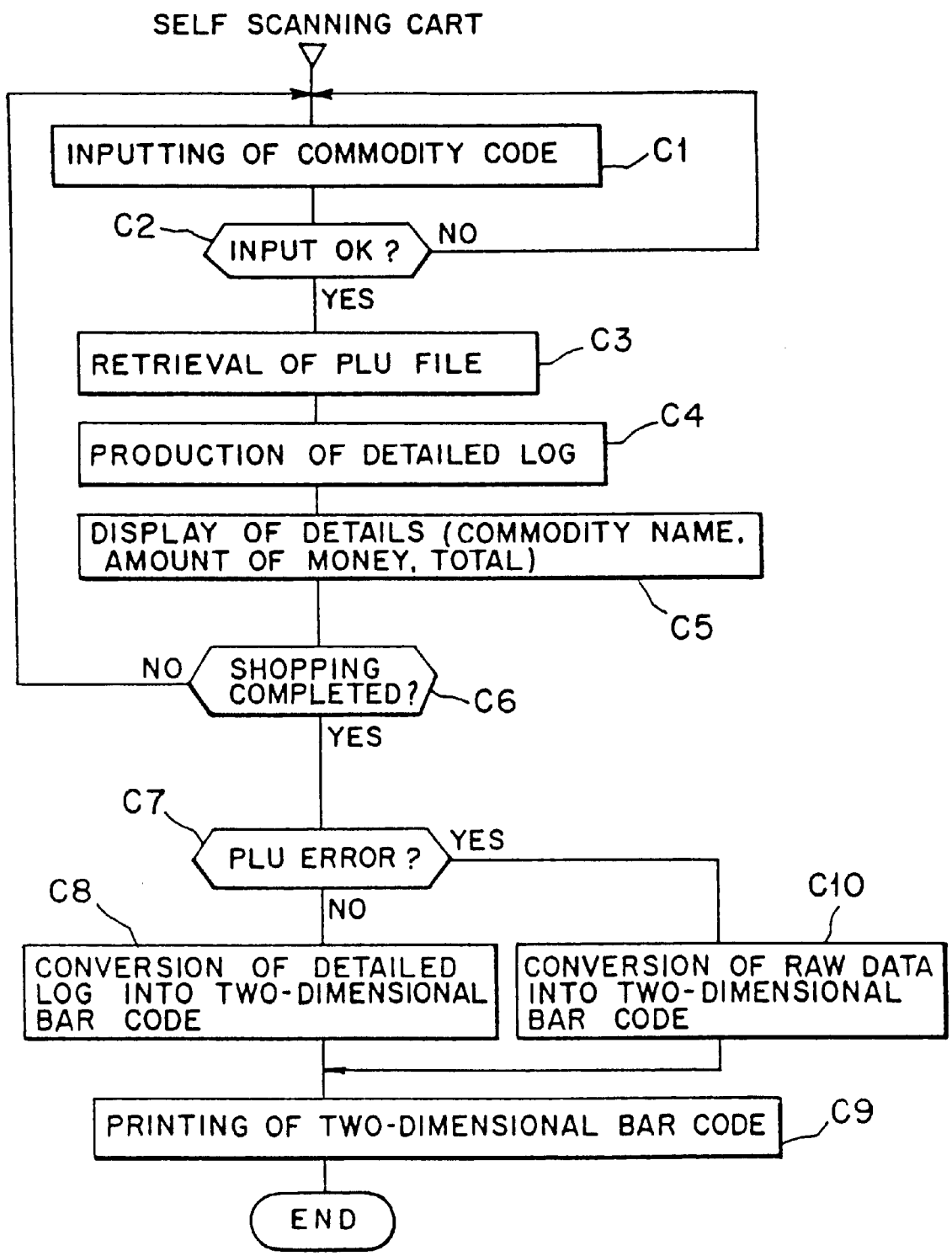
FIG. 12 is a flow chart illustrating operation of a purchased commodity accommodating and transporting apparatus employed in the POS system shown in FIG. 11.
Figure 13:
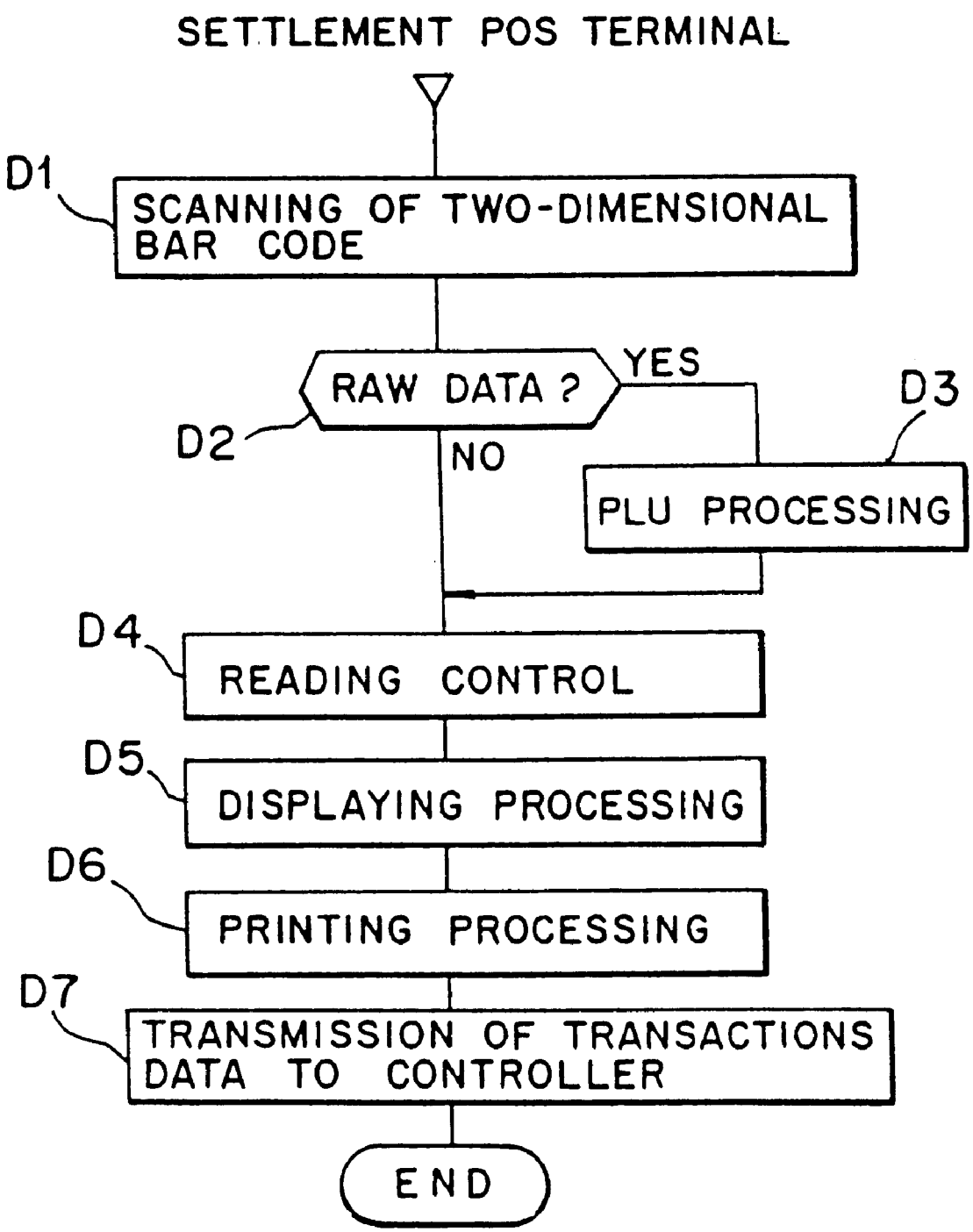
FIG. 13 is a flow chart illustrating operation of a settlement POS terminal employed in the POS system shown in FIG. 11.

Referring now to FIGS. 11 to 13, there is shown a POS system according to a second preferred embodiment of the present invention. Also the POS system of the present embodiment employs such a self scanning cart 100 as shown in FIG. 8. Since the self scanning cart 100 is commonly employed in the present embodiment, overlapping description is omitted herein to avoid redundancy.

Also the POS system of the present embodiment includes at least one self scanning cart 100, at least one settlement POS terminal 70, and a controller (upper control section) 90 as seen in FIG. 11. The self scanning cart 100, the settlement POS terminal 70 and the controller 90 have the same hardware constructions as those described hereinabove with reference to FIGS. 5 to 7, respectively, and overlapping description of them is omitted herein.

The POS system in the present embodiment is functionally constructed in such a manner as shown in FIG. 11 from the self scanning cart 100, the settlement POS terminal 70, and the controller 90 described above.

In particular, referring to FIG. 11, the CPU 51 of the self scanning cart 100 has functions as an input control section 51a, a commodity information file control section 51b, a calculation control section 51c, a detailed log control section 51d, and a two-dimensional bar code printing control section 51f which are similar to those of the first embodiment, and further has functions as a commodity information file error determination section 51g and a print contents switching section 51h.

It is to be noted that the CPU 51 of the self scanning cart 100 in the present embodiment does not have a function as the inquiring processing control section 51e provided in the first embodiment, but has functions as the commodity information file error determination section 51g and the print contents switching section 51h instead. Further, the two-dimensional bar code printing control section 51f in the present embodiment has a function of printing a detailed log produced by the detailed log control section 51d as a two-dimensional bar code, and another function of printing commodity code information (raw data of a bar code 50a) read by the scanner 57 as a two-dimensional bar code.

The commodity information file error determination section (error determination section) 51g determines whether or not an error has occurred upon price retrieval by the commodity information file control section 51b. The commodity information file error determination section 51g determines that a retrieval error has occurred when retrieval of the commodity information file 59 by the commodity information file control section 51b has failed to find out relevant data.

The print contents switching section 51h switches, when it is determined by the commodity information file error determination section 51g that an error has occurred, contents to be printed by the two-dimensional bar code printing section 58 from detailed log data (a commodity number, a commodity name, a price and so forth) produced by the detailed log control section 51d to commodity code information (raw data of a bar code 50a) read by the scanner 57. The print contents switching section 51h performs the switching operation so that, normally when no retrieval error occurs, the contents to be printed by the two-dimensional bar code printing section 58 may be a detailed log produced by the detailed log control section 51d.

Meanwhile, the CPU 71 of the settlement POS terminal 71 in the present embodiment has functions as a reading control section 71a, a commodity information file control section 71b, an inquiring processing control section 71c, a transactions log control section 71d, a printing control section 71e, and a transactions data transmission control section 71f which are similar to those of the first embodiment, and further has a function of a print contents determination section 71g.

The print contents determination section 71g determines whether a result of reading by the two-dimensional bar code reading section 79 inputted by way of the reading control section 71a is detailed log data or commodity code information (raw data).

The commodity information file control section 71b in the present embodiment retrieves, when it is determined by the print contents determination section 71g that printed contents are commodity code information, commodity numbers, commodity names, prices (unit prices) and so forth of commodities 50 accommodated in the basket member 102 of the self scanning cart 100 from the commodity information file 80 in accordance with two-dimensional bar code information read by the two-dimensional bar code reading section 79. Further, also the commodity information file control section 71b of the second embodiment has a function of rendering the inquiring processing control section 71c operative to cause the controller 90 to make a request for price retrieval when retrieval of the commodity information file 80 has failed to find out relevant data similarly as in the first embodiment.

Further, the transactions log control section 71d in the present embodiment produces, when it is determined by the print contents determination section 71g that printed contents are commodity code information, a transactions log in accordance with a result of retrieval by the commodity information file control section 71b in a quite similar manner as in the first embodiment, displays the transactions log as a receipt image on the display section 74, stores the transactions log into the transactions log file 81, and effects final settlement of accounts (payment) for purchased commodities accommodated in the basket member 102 of the self scanning cart 100.

On the other hand, when it is determined by the print contents determination section 71g that printed contents are detailed log data, the transactions log control section 71d in the present embodiment produces a transactions log in accordance with a result of reading (detailed log data) by the two-dimensional bar code reading section 79 inputted from the reading control section 71a, displays the transactions log as a receipt image on the display section 74, stores the transactions log into the transactions log file 81, and effects final settlement of accounts (payment) for the purchased commodities accommodated in the basket member 102 of the self scanning cart 100.

Operation of the POS system of the second embodiment of the present invention having the construction described above is illustrated in FIGS. 12 and 13. Referring first to FIG. 12, similarly as in the first embodiment, a customer itself will read a bar code 50a applied to a commodity 50 to be purchased by means of the scanner 57 and input the commodity code information (step C1). Then, if such inputting has been performed correctly (input OK, determination of YES at step C2), then the commodity information file control section 51b retrieves a commodity number, a commodity name, a price (unit price) and so forth of the commodity 50 from the commodity information file 59 in accordance with the commodity code information read by the scanner 57 and inputted from the input control section 51a (step C3).

Then, a total amount of money read in till now is calculated by the calculation control section 51c using the result of the price retrieval in accordance with the commodity code information read in from the scanner 57. A detailed log till now is produced by the detailed log control section 51d in accordance with a result of the calculation and results of price retrieval of the commodity code information read till now (step C4). The detailed log is stored into the detailed log file 60 and displayed in a receipt image on the display section 54 (step C5).

The processes at step C1 to C5 are repeated until the customer depresses the end key of the keyboard section 55 to effect inputting of ending of the use (step A6).

Then, in the present embodiment, after the customer depresses the end key of the keyboard section 55 to end its shopping, the customer will move and transport the commodities carried on the self scanning cart 100 to the settlement POS terminal 70.

Thereupon, on the self scanning cart 100, the commodity information file error determination section 51g determines whether or not a price retrieval error that relevant data cannot be obtained has occurred in retrieval of the commodity information file 59 by the commodity information file control section 51b (step C7)

When it is determined by the commodity information file error determination section 51g that no price retrieval error has occurred (determination of NO at step C7), detailed log data (a commodity number, a commodity name, a price and so forth) produced by the detailed log control section 51d are converted into a two-dimensional bar code by the two-dimensional bar code printing control section 51f (step C8), and the two-dimensional bar code is printed by the two-dimensional bar code printing section 58 (step C10).

On the contrary, when it is determined by the commodity information file error determination section 51g that a price retrieval error has occurred (determination of YES at step C7), the print contents switching section 51h switches the contents to be printed by the two-dimensional bar code printing section 58 from the detailed log data produced by the detailed log control section 51d to the commodity code information (raw data of a bar code 50a) read by the scanner 57.

Thereafter, similarly as in the first embodiment, the commodity code information (raw data of the bar code 50a which are an array of digits before price retrieval processing is performed) read by the scanner 57 and inputted by way of the input control section 51a is edited into a two-dimensional bar code by the two-dimensional bar code printing control section 51f (step C9). The two-dimensional bar codes are printed by the two-dimensional bar code printing section 58 (step C10).

Referring now to FIG. 13, upon settlement of accounts at the settlement POS terminal 70, an operator of the settlement POS terminal 70 will receive the printed result of the two-dimensional bar code from the two-dimensional bar code printing section 58 of the self scanning cart 100 and read the two-dimensional bar code by means of the two-dimensional bar code reading section 79 (step D1).

Then, in the settlement POS terminal 70 of the present embodiment, the print contents determination section 71g determines in accordance with the two-dimensional bar code information read by the two-dimensional bar code reading section 79 and inputted from the reading control section 71a whether a result of reading by the two-dimensional bar code reading section 79 inputted thereto by way of the reading control section 71a is detailed log data or commodity code information (raw data) (step D2).

When it is determined by the print contents determination section 71g that the result of the reading is raw data (determination of YES at step D2), a commodity number, a commodity name, a price (unit price) and so forth of the commodity 50 are retrieved from the commodity information file 80 by the commodity information file control section 71b in a similar manner as in the first embodiment (step D3).

It is to be noted that, in this instance, when the retrieval of the commodity information file 80 by the commodity information file control section 71b has failed to find out relevant data, the inquiring processing control section 71c transmits an inquiring telegram to the controller 90 to make a request for price retrieval, and a result of such price retrieval (result of retrieval of the commodity information file 95) by the commodity information file control section 91b of the controller 90 is received.

Such results of price retrieval by the commodity information file control section 71b as described above are successively read into the transactions log control section 71d (step D4), and by the transactions log control section 71d, final settlement of accounts for the purchased commodities accommodated in the basket member 102 of the self scanning cart 100 is performed in accordance with the results of the retrieval read from the commodity information file control section 71b. In particular, a transactions log is produced and displayed as a receipt image on the display section 74 (step D5). Further, the transactions log is stored into the transactions log file 81 and printed by and outputted from the printing section 77 as a receipt (step D6).

On the other hand, when it is determined by the print contents determination section 71g that the result of the reading by the two-dimensional bar code reading section 79 is not raw data but detailed log data (determination of NO at step D2), the detailed log data of the two-dimensional bar code reading section 79 inputted from the reading control section 71a are read into the transactions log control section 71d (step D4). Then, by the transactions log control section 71d, final settlement of accounts for the purchased commodities accommodated in the basket member 102 of the self scanning cart 100 is performed in accordance with the result of the reading. In particular, a transactions log is produced and displayed as a receipt image on the display section 74 (step D5). Further, the transactions log is stored into the transactions log file 81 and printed by and outputted from the printing section 77 as a receipt (step D6).

The transactions log produced by the transactions log control section 71d is transmitted as transactions data to the controller 90 by way of the communication section 73 by the transactions data transmission control section 71f similarly as in the first embodiment (step D7). Then, on the controller 90 side, the transactions data transmitted thereto from the settlement POS terminal 70 side are received by the transactions data reception control section 91c by way of the communication section 93 and displayed on the display section 94 under the control of the display control section 91d.

In this manner, with the POS system of the second embodiment of the present invention, if a customer ends its shopping using the self scanning cart 100, detailed log data of commodities purchased by the customer are printed and outputted as a two-dimensional bar code from the two-dimensional bar code printing section 58, and then, upon settlement of accounts by the settlement POS terminal 70, the two-dimensional bar code data are read by the two-dimensional bar code reading section 79 of the settlement POS terminal 70 and the detailed data are sent at a time to the settlement POS terminal 70. Consequently, price retrieval (price lookup) processing need not be performed on the settlement POS terminal 70 as in the first embodiment.

Accordingly, similar effects or advantages to those of the first embodiment can be obtained. In addition, the check-out time (settlement time) is further reduced.

Further, in the second embodiment, if a retrieval error occurs upon price retrieval by the self scanning cart 100, information of a two-dimensional bar code to be printed by the two-dimensional bar code printing section 58 is automatically switched to commodity code information (raw data of a bar code 50a), and price retrieval processing is performed by the settlement POS terminal 70 in accordance with the commodity code information.

Accordingly, when a detection error occurs, communications of an inquiring telegram or some other operation need not be performed between the self scanning cart 100 and the settlement POS terminal 70 as in the first embodiment. Consequently, the burden to the controller 90 can be reduced.

The present invention is not limited to the specifically described embodiment, and variations and modifications may be made without departing from the scope of the present invention.

What is claimed is:

1. A purchased commodity accommodating and transporting apparatus having a self scanning function, comprising:

a commodity code reading section for reading a commodity code applied to a commodity;

an accommodation section, associated with said commodity code reading section, for accommodating therein a commodity whose commodity code has been read by said commodity code reading section; and a two-dimensional bar code printing section, operatively connected with said commodity code reading section, for printing commodity code information read by said commodity code reading section as a two-dimensional bar code.

\* \* \* \* \*